US008620244B2

(12) United States Patent
Roeckl et al.

(10) Patent No.: US 8,620,244 B2
(45) Date of Patent: Dec. 31, 2013

(54) ELECTRICAL COMPONENT WITH A FRONT-END CIRCUIT

(75) Inventors: Christoph Roeckl, Munich (DE); Peter Hagn, Finsing (DE); Torsten Moebes, Munich (DE)

(73) Assignee: EPCOS AG, Munich (DE)

( * ) Notice: Subject to any disclaimer, the term of this patent is extended or adjusted under 35 U.S.C. 154(b) by 425 days.

(21) Appl. No.: 12/613,174

(22) Filed: Nov. 5, 2009

(65) Prior Publication Data

US 2010/0090917 A1    Apr. 15, 2010

Related U.S. Application Data

(63) Continuation of application No. PCT/EP2008/055662, filed on May 7, 2008.

(30) Foreign Application Priority Data

May 8, 2007    (DE) .......................... 10 2007 021 581

(51) Int. Cl.
*H04B 7/08* (2006.01)
(52) U.S. Cl.
USPC ................ 455/132; 455/553.1; 455/276.1; 455/304; 455/306
(58) Field of Classification Search
USPC .......... 455/552.1, 553.1, 132–141, 303–307, 455/335, 269–294
See application file for complete search history.

(56) References Cited

U.S. PATENT DOCUMENTS

| 5,815,052 | A | 9/1998 | Nakajima et al. |
| 6,060,960 | A | 5/2000 | Tanaka et al. |
| 6,249,687 | B1 * | 6/2001 | Thomsen et al. .......... 455/553.1 |
| 6,466,768 | B1 * | 10/2002 | Agahi-Kesheh et al. ....... 455/78 |
| 6,745,046 | B1 * | 6/2004 | Eckert et al. ............... 455/552.1 |
| 6,751,470 | B1 * | 6/2004 | Ella et al. ................... 455/552.1 |
| 6,766,149 | B1 | 7/2004 | Hikita et al. |
| 6,995,630 | B2 | 2/2006 | Satoh et al. |
| 7,003,312 | B2 * | 2/2006 | Kemmochi et al. ........ 455/552.1 |
| 7,062,249 | B2 * | 6/2006 | Park et al. ...................... 455/335 |
| 7,149,496 | B2 * | 12/2006 | Horiuchi et al. .............. 455/333 |
| 7,187,945 | B2 * | 3/2007 | Ranta et al. ................. 455/552.1 |
| 7,269,441 | B2 * | 9/2007 | Ella et al. ................... 455/553.1 |
| 7,373,171 | B2 * | 5/2008 | Nakai ......................... 455/552.1 |

(Continued)

FOREIGN PATENT DOCUMENTS

| DE | 696 19 164 T2 | 7/2002 |
| DE | 103 45 971 B4 | 5/2005 |

(Continued)

OTHER PUBLICATIONS

Gu,W-C, A., "Integration of RF Front-End Modules in Cellular Handsets", Oct. 2004, pp. 1285-1290, IEEE, Solid-State and Integrated Circuits Technology.

*Primary Examiner* — Edward Urban
*Assistant Examiner* — Rui Hu
(74) *Attorney, Agent, or Firm* — Slater & Matsil, L.L.P.

(57) ABSTRACT

An electrical component with a diversity front-end circuit that is exclusively designed to transmit received signals is disclosed. The diversity front-end circuit is capable of receiving incoming signals in at least two frequency bands simultaneously. The diversity front-end circuit includes at least two receiving paths coupled to a diversity antenna, wherein the received signals of the respective frequency band are transmitted in each receiving path.

15 Claims, 4 Drawing Sheets

(56) References Cited

U.S. PATENT DOCUMENTS

| | | |
|---|---|---|
| 7,420,438 B2 * | 9/2008 | Nakai et al. .................... 333/133 |
| 7,580,727 B2 * | 8/2009 | Boyle et al. ................. 455/552.1 |
| 7,680,477 B2 * | 3/2010 | Yanduru et al. ............... 455/340 |
| 7,917,170 B2 * | 3/2011 | Zhitnitsky .................. 455/552.1 |
| 2002/0127973 A1 | 9/2002 | Furutani et al. |
| 2002/0137471 A1 * | 9/2002 | Satoh et al. .................... 455/83 |
| 2004/0053595 A1 * | 3/2004 | Shinbo et al. ................. 455/316 |
| 2004/0092285 A1 * | 5/2004 | Kodim ....................... 455/552.1 |
| 2004/0132487 A1 * | 7/2004 | Kearns ....................... 455/552.1 |
| 2004/0217914 A1 | 11/2004 | Yamashita et al. |
| 2005/0079828 A1 * | 4/2005 | Tasaka ............................ 455/78 |
| 2005/0085201 A1 * | 4/2005 | Martin et al. ............... 455/168.1 |
| 2005/0159113 A1 * | 7/2005 | Iida ................................ 455/78 |
| 2005/0227631 A1 * | 10/2005 | Robinett ......................... 455/83 |
| 2005/0245201 A1 * | 11/2005 | Ella et al. ........................ 455/78 |
| 2005/0245283 A1 * | 11/2005 | Boyle et al. ................. 455/552.1 |
| 2006/0192632 A1 * | 8/2006 | Nakai et al. .................... 333/133 |
| 2006/0223450 A1 * | 10/2006 | Dacosta .......................... 455/73 |
| 2007/0190954 A1 * | 8/2007 | Murakami et al. ............. 455/132 |
| 2007/0191055 A1 * | 8/2007 | Kovacs et al. .............. 455/552.1 |
| 2008/0186106 A1 * | 8/2008 | Christian et al. .............. 333/133 |

FOREIGN PATENT DOCUMENTS

| | | |
|---|---|---|
| DE | 10 2005 020 086 A1 | 11/2006 |
| EP | 0 820 155 A2 | 1/1998 |
| EP | 1 014 592 A2 | 6/2000 |
| EP | 1 361 668 A1 | 11/2003 |
| JP | 2000-165274 A | 6/2000 |
| JP | 2005-151194 A | 6/2005 |
| JP | 2005-333485 A | 12/2005 |
| JP | 2006-086871 | 3/2006 |
| WO | WO 2005/104389 A1 | 11/2005 |

* cited by examiner

ELECTRICAL COMPONENT WITH A FRONT-END CIRCUIT

This application is a continuation of co-pending International Application No. PCT/EP2008/055662, filed May 7, 2008, which designated the United States and was not published in English, and which claims priority to German Application No. 10 2007 021 581.0 filed May 8, 2007, both of which applications are incorporated herein by reference.

BACKGROUND

An electrical component with a front-end circuit has been disclosed in, for instance, U.S. Patent Application Publication US 2004/0217914 A1.

SUMMARY

An electrical component with a front-end circuit that demonstrates high selectivity between frequency bands is disclosed.

An electrical component is disclosed, having a diversity front-end circuit that is suitable for the simultaneous reception of incoming signals in at least two frequency bands. The diversity front-end circuit comprises at least two receiving paths coupled to a diversity antenna, wherein the received signals of the corresponding frequency band are transmitted along each receiving path. The diversity front-end circuit is exclusively designed to transmit received signals.

A diversity antenna refers to a supplementary antenna that is present in the component as a second antenna in addition to the main antenna.

Embodiments of the invention now propose a second front-end circuit, specifically a diversity front-end circuit, that is coupled to the diversity antenna. The diversity antenna, and the diversity front-end circuit coupled to it, here fulfill the partial function of receiving and forwarding RX signals.

Both antennas, and the front-end circuits associated with them, can thus be used simultaneously for data transmission.

All the components associated with the diversity antenna or with the diversity front-end circuit may be referred to below using the "diversity" prefix. The absence of this prefix however does not necessarily mean that reference is being made to other components that do not belong to the diversity front-end circuit.

The diversity front-end circuit can have a modular structure and may be located on a separate module, the diversity front-end module.

In addition to the diversity front-end circuit, the component also incorporates a primary front-end circuit associated with the primary antenna, and this, as well as processing and transmitting TX signals (outgoing signals), also comprises RX paths (receiving paths).

In one advantageous embodiment of the invention, the receiving paths are implemented twice, and are therefore present both in the diversity front-end circuit and in the primary front-end circuit. This makes it possible to receive a given RX signal in parallel over two RX paths. The two RX signals received through the two RX paths can then be correlated in the receiver. It is possible in this way to balance out, and therefore to compensate for, the effects of noise in one of the RX paths, such as may arise at particular frequencies as a result of reflections and negative interference effects. At any given time the receiver may then choose to process the RX signal from the primary front-end circuit, from the diversity front-end circuit, or a correlation product of the two, depending on which of these options offers the best signal strength and rejection of interference. It is also possible while receiving in one band to monitor for additional incoming calls on the same or in another band, since two antennas and front-end circuits that are not electrically connected, and which therefore can be operated independently of one another, are present.

During normal reception, the RX paths of both front-end circuits are "active". In one embodiment however a facility is provided, in particular operating modes, to disconnect the diversity front-end circuit from the diversity antenna by means of a switch. This can, for instance, take place during transmission operation according to the GSM (Global System for Mobile Communication) method. This prevents the powerful GSM TX signals that could be coupled into the diversity antenna from damaging the sensitive RX paths. A switch of this sort preferably consists of a semiconductor element such as a diode or a transistor that can be mounted as a discrete semiconductor component on the diversity front-end module.

Advantageous embodiments of the diversity front-end circuit are described and discussed below.

In one advantageous embodiment, the diversity front-end circuit is designed for simultaneous reception of incoming signals in at least three frequency bands. The diversity front-end circuit incorporates at least three receiving paths coupled to a diversity antenna.

The diversity front-end circuit is preferably designed for transmitting the data of incoming signals from third generation mobile radio systems. The signals in each frequency band are preferably transmitted in accordance with a WCDMA system. WCDMA stands for Wideband Code Division Multiple Access.

In one advantageous embodiment, the diversity front-end circuit incorporates an antenna path connected to the diversity antenna as well as a crossover network connected to the diversity antenna. No output signals are transmitted along the antenna path associated with the diversity antenna. The antenna path is used to transmit received signals in at least three different frequency bands. The crossover network connects the antenna path to at least three receiving paths designed for three or more frequency bands. In each receiving path, the crossover network incorporates a filter, arranged in the path, operating with acoustic waves. In addition, the crossover network includes a matching network on the antenna side that is located between the antenna and the associated filter. The matching network matches the impedances of the antenna and the corresponding filter at a frequency in the passband of that filter.

Within the passband of the respective receiving path, the matching network matches the input impedance of the respective acoustic wave filter to the impedance of the antenna. As a result of a simultaneous phase shift in the input impedances of all the other filters, to the open end of the Smith chart, all the other signal paths are blocked in this frequency band due to the mis-matched impedances.

A sufficiently high isolation between the different frequency bands can be achieved through the high-pass or low-pass filtering effect of the matching network. The high selectivity of the acoustic wave filters is, in principle, capable of providing adequate suppression of the transmission frequencies in the corresponding frequency bands.

The matching network, in particular, applies a phase shift to the input impedances of the acoustic wave filters. Appropriate selection of the phase shift makes it possible to separate the signals that arrive at the antenna, and that are transmitted in different frequency bands, from one another. The frequency bands are advantageously separated from one another by a crossover network that is only comprised of passive circuit elements. This does not require any active control, a feature that offers the advantage of low current consumption by the component.

At least one part of the matching network in each receiving path is preferably implemented in the form, for example, of an LC network. A T-network, a π-network or an L-network may be provided, for example. LC networks of higher order, such as can be formed of a combination of the network types mentioned above, are also suitable.

Each partial matching network preferably comprises at least one shunt branch. A parallel inductor or a parallel capacitor is, for example, preferably incorporated in each shunt branch. The partial matching network concerned can also comprise at least one series inductor or at least one series capacitor.

In one advantageous embodiment, a first and a second receiving path are connected to a common receiving path in the diversity front-end circuit; the common path is electrically connected, preferably conductively, to the third receiving path and to the antenna path. Preferably, at least a part of the matching network is implemented in the first, second and third receiving paths and in the common receiving path.

It is, in particular, possible for receiving paths whose frequencies differ from one another by less than an octave to be grouped into a common receiving path that is to be connected on the antenna side to the third receiving path. In contrast, received signals whose frequencies differ by more than an octave are preferably brought together at the antenna side.

In principle, each receiving path can be assigned to any desired transmission band. In one embodiment, the first transmitting path is assigned to the UMTS band at 2.1 GHz, the second receiving path to the PCS band at 1.9 GHz, and the third receiving path to the GSM 850 band.

In one advantageous embodiment, the acoustic wave filters comprise at least one converter operating with surface acoustic waves and/or at least one resonator operating with volume acoustic waves.

The matching network preferably only consists of passive circuit elements such as inductors and capacitors. Preferably at least one capacitor and at least one inductor is included in each receiving path. In one embodiment, the matching network comprises at least one section of a high-frequency transmission line, such as a stripline. This refers, in particular, to lines whose length is approximately a quarter wavelength at the pass frequency of the filter concerned.

Any circuit elements that are capable of creating a phase rotation are thus suitable for use as the fundamental elements in the matching network.

The component is preferably implemented as a modular, compact part suitable for surface mounting. The component comprises a carrier substrate and at least one chip mounted on the carrier substrate in which the acoustic filters are implemented. All the filters, or at least two filters, can be implemented in one common acoustic chip. Each filter can, alternatively, be implemented in its own chip.

At least one element of the matching network, in particular, at least one inductor and/or at least one capacitor, can be implemented in the carrier substrate. In principle, the matching network can be entirely integrated within the carrier substrate.

At least one element of the matching network, in particular, at least one inductor and/or at least one capacitor, can also be arranged on the carrier substrate. This latter arrangement is advantageous if an inductor or a capacitor with high Q is to be used in the matching network.

The matching network preferably comprises at least one low-pass filter and at least one high-pass filter. In one embodiment, at least two of the receiving paths are connected to the low-pass filter. In one embodiment, at least two of the receiving paths are connected to the high-pass filter.

At least one matching element of the matching network, selected from a series inductor, a series capacitor, a parallel inductor, a parallel capacitor and a conductive line section, is preferably arranged in at least one of the receiving paths connected to the low-pass filter or to the high-pass filter.

In one advantageous embodiment, the component comprises at least one switching element that is connected to the antenna path or is located in the antenna path. The switching element is preferably a semiconductor element, such as a diode or a transistor.

The switching element is provided in order to block a receiving path that is assigned to a frequency band, within which both received signals and transmitted signals are transmitted at least one common frequency. The switching element is preferably then operated when a transmission signal is being sent. This allows, in particular, the transmitted signals in a receiving path to be suppressed if the transmission band overlaps the reception band concerned. The switching element can also be used to block a receiving path when a transmitting path is located close to it and, for instance, operates with a relative bandwidth spacing of less than 5% from the reception band that is assigned to the receiving path.

If it is possible to block the particular receiving path with the aid of the switching element and thereby protect the input of the associated filter, then one result is that filters that are not capable of handling particularly high powers can be used.

At least one switching element can also be connected to at least one of the receiving paths or arranged within this receiving path.

In one embodiment, the switching element that is connected to the receiving path concerned is arranged between the matching network and the acoustic filter that is arranged in this receiving path.

The switching element is preferably located in a shunt branch to ground. In one embodiment, the shunt branch contains a diode and a capacitor connected in series with it. The diode has inductance when it is conducting, and in combination with the capacitor it can constitute a series resonant circuit. The resonant frequency of the series resonant circuit is equal to a transmission frequency that is to be suppressed in the respective signal path associated with the diode. At a blocking frequency the series resonant circuit constitutes an HF short-circuit to ground. This then grounds the corresponding signal path. In this way the filter input that requires protection is shielded against overload during transmission.

In one embodiment the switching element is located on the carrier substrate, which comprises at least one dielectric layer or alternating layers of dielectric and of metallization.

The switching element can, however, also be implemented within the carrier substrate, if the substrate is implemented using semiconductor technology. In that case the substrate can use Si or GaAs as the basic material.

In one embodiment, the carrier substrate comprises ceramic layers and at least one metallization layer between two ceramic layers. Vertical electrical leadthroughs for the chips are arranged in the carrier substrate. At least one element of the matching network is implemented in the metallization layers by means of a conductive track or by means of conductive areas.

LTCC or HTCC ceramics, in particular, can be considered as the ceramic material. LTCC stands for Low Temperature Cofired Ceramic, while HTCC stands for High Temperature Cofired Ceramic.

Dielectric layers of organic material are also suitable as the basic material for the carrier substrate.

At least a part of the matching network can be implemented as an IPD block integrated into a semiconducting carrier substrate. IPD stands for Integrated Passive Device. It is possible, in principle, for the phase shifter that is to be used in the matching network to be implemented in a carrier substrate based on Si or GaAs.

The chip concerned may have its own housing. It is also, however, possible for a bare-die chip to be mounted on the carrier substrate, e.g., by encapsulating in casting compound. The chip and the carrier substrate may also have a common housing.

Each chip may be bonded to the carrier substrate using SMD technology, as a flip-chip, or using wire bonds.

The additional front-end circuit that is connected to the main antenna is, in one embodiment, implemented as a separate component that is mounted, like the component disclosed, on a circuit board. The two components are not electrically connected to one another.

It is in principle possible for the two front-end circuits to be implemented in one compact module, i.e. as one common component. The individual front-end circuits are then preferably connected together by electrical connections that are integrated into what is now a common carrier substrate.

The diversity front-end circuit can, for instance, be used for monitoring incoming calls in all the receiving paths at the same time. In one favorable embodiment, one of the receiving paths of the diversity front-end circuit is used to transmit GPS data. GPS stands for Global Positioning System. When GPS is used it is both possible and preferable that these signals are not also received at the transmission and reception antenna or by the front-end circuit that is connected to the transmitting and receiving antenna.

An output-side matching network can be included at the output of at least one receiving path. The acoustic filter in the associated receiving path is arranged between the matching networks at the antenna side and the output side. The matching network at the output side is used to match the output impedance of the corresponding acoustic filter to the specified impedance level, e.g. 50 Ohm or 75 Ohm, or to a complex impedance for matching the LNA amplifier in the passband.

The output of the corresponding receiving path may then be implemented in a form that is not symmetrical with respect to ground (single-ended) or a form that is symmetrical about ground (differential). The input to the associated filter may or may not be symmetrical about ground.

Electrical contacts for the component are located on the underside of the carrier substrate. The electrical contacts comprise signal connections that are connected to the output of the associated receiving path, ground connections and the connection to the diversity antenna, as well as, in some cases, a control connection for a switchable overload protection. The connections to the first and second receiving paths which, in one embodiment, are assigned to the higher frequency reception bands, can be located next to one another. The connection to the third receiving path (assigned to the lower frequency band) can also be located between the connections for the first and second receiving paths.

BRIEF DESCRIPTION OF THE DRAWINGS

The proposed component and its favorable embodiments are explained below with the aid of the figures which are schematic and are not true to scale.

The following list of reference symbols may be used in conjunction with the drawings:
AN Matching network at the input
AN1, AN2 Partial matching networks
AN3, AN4, AN5 Matching networks at the output
C1, C2, C3 Capacitors
CH1, CH2, CH3 Chips
DA Diversity antenna
D1, D2, D3 Diodes
F1, F2, F3 Acoustic wave filters
HPF High-pass filter
L1 Inductor
RX Antenna path
RX12 Common receiving path
RX1 First receiving path
RX2 Second receiving path
RX3 Third receiving path
TPF Low-pass filter
TS Carrier substrate
Vc Control voltage

DETAILED DESCRIPTION OF ILLUSTRATIVE EMBODIMENTS

Figure 1:
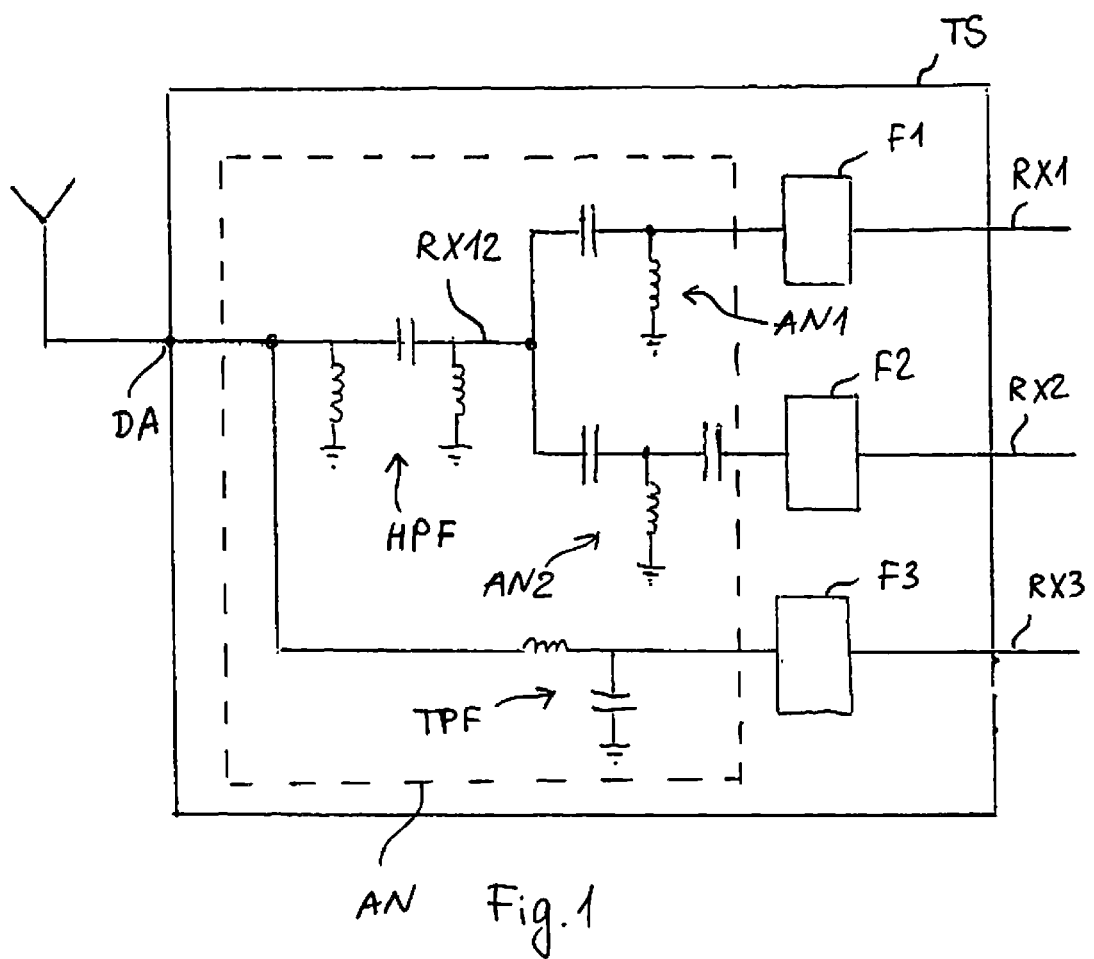
FIG. 1 shows the equivalent circuit diagram of a component having a triplexer without switching elements.

In FIG. 1, the diversity section of an exemplary component is shown with an integrated diversity front-end circuit. The front-end circuit comprises an antenna path RX whose input is connected to an antenna connection. A diversity antenna DA is connected to the antenna terminal.

At its output, the antenna path RX branches into receiving paths RX12 and RX3. The received signals in the first and second frequency bands are transmitted in the common receiving path RX12. The common receiving path RX12 branches at its output into individual receiving paths RX1 and RX2. The first of these receiving paths RX1 is assigned to one frequency band, e.g., UMTS, the second receiving path RX2 to a second frequency band, e.g., PCS, and the third receiving path RX3 to a third frequency band, e.g., GSM850.

The front-end circuit comprises a matching network AN. The matching network AN comprises a low-pass filter TPF arranged in the third receiving path RX3 and a high-pass filter HPF arranged in the common receiving path RX12. The matching network AN also comprises a partial matching network AN1 arranged in the first receiving path RX1 and a partial matching network AN2 arranged in the second receiving path RX2. The partial matching networks AN1, AN2 each primarily perform the function of a phase shifter.

An acoustic wave filter, F1, F2 and F3 respectively, is located in each of the receiving paths RX1, RX2, RX3.

Figure 2:
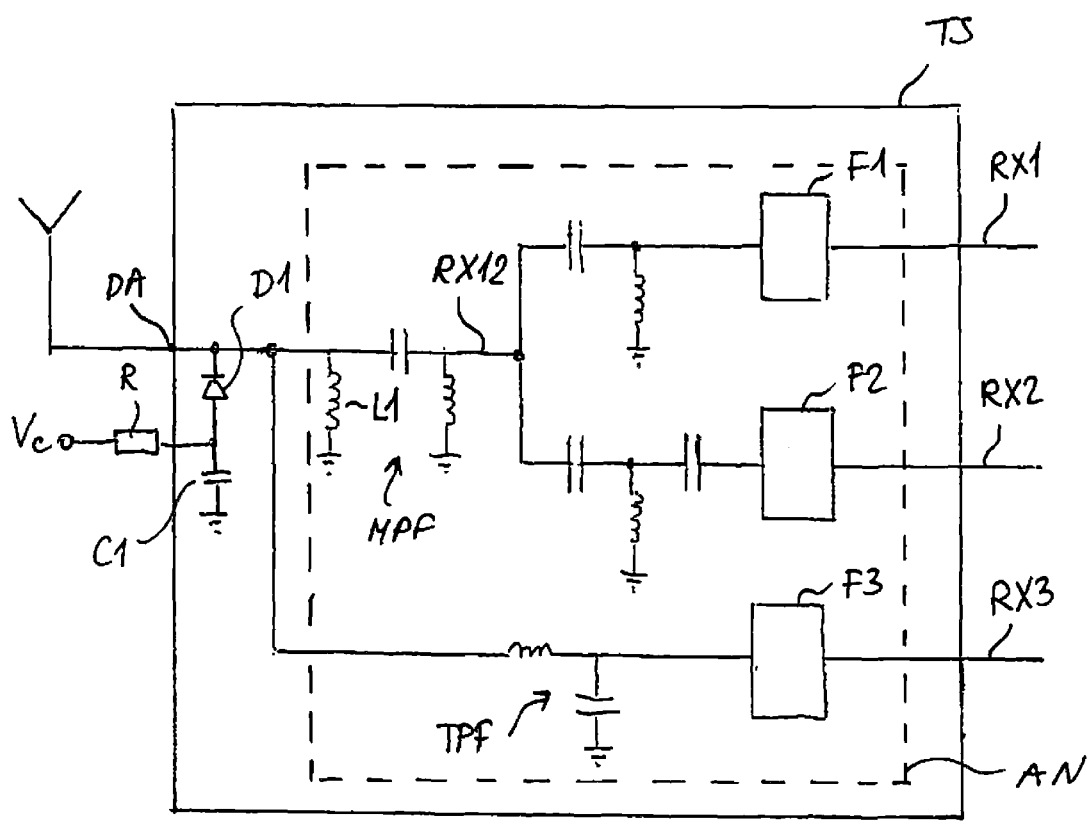
FIG. 2 shows the equivalent circuit diagram of a component with a triplexer and a switching element connected to the antenna path.

FIG. 2 illustrates an advantageous further development of the exemplary embodiment explained above. In this case, a shunt branch is positioned between the antenna path ground, containing a switching element which in this case consists of a diode D1 and a capacitor C1 connected in series with it.

The diode D1 is operated by a control voltage $V_c$. The circuit elements R, D1 and L1 constitute a DC path to ground when the diode D1 is switched on.

The forward-biased diode D1 and the capacitor C1 together constitute a series resonant circuit that presents a short circuit between the antenna path and ground for HF signals at its resonant frequency. In this way the front-end circuit is completely blocked at this frequency (preferably a transmission frequency).

Figure 3:
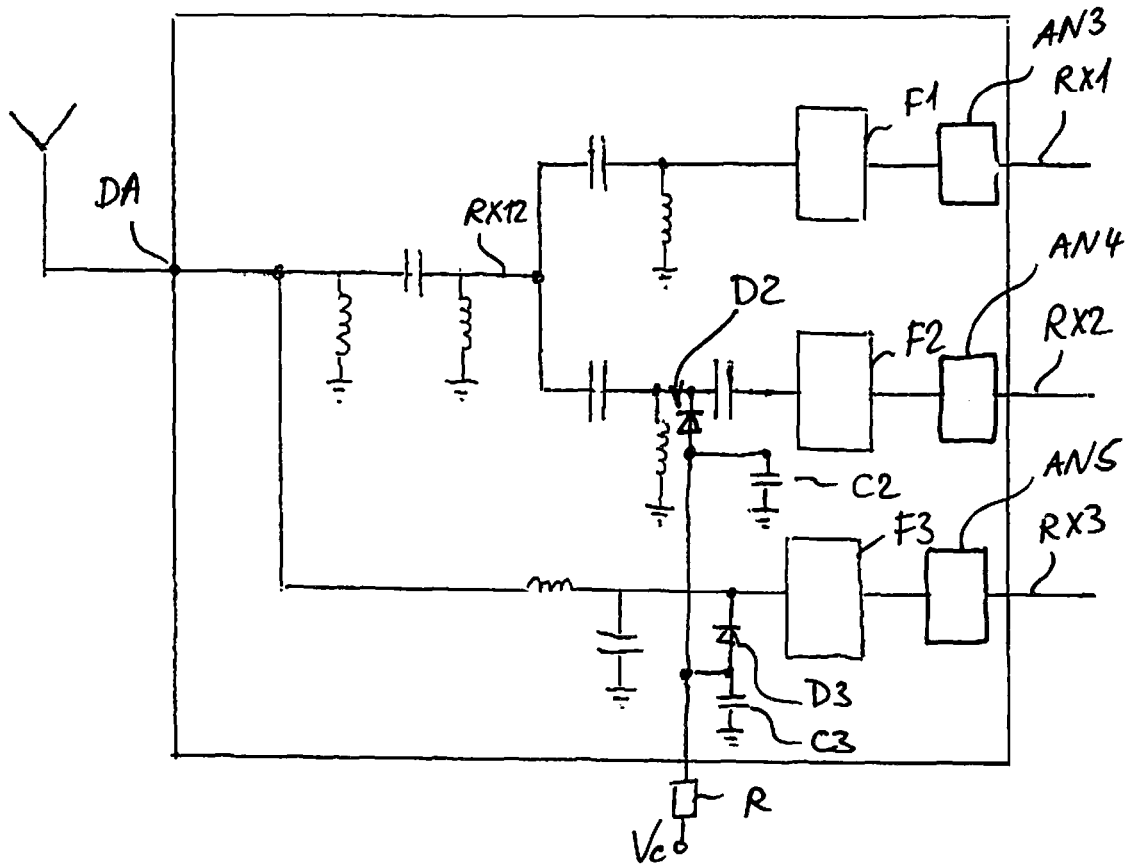
FIG. 3 shows the equivalent circuit diagram of a component with a triplexer and the switching elements connected to the receiving paths.

Unlike FIG. 2, in the embodiment according to FIG. 3 the receiving paths RX2 and RX3 are blocked in the diversity front-end circuit instead of the antenna path RX. In this case the shunt branches containing the diodes D2, D3 and the capacitors C2, C3 are connected between the matching network AN at the input and the inputs to each of the filters F2, F3. Both diodes D2, D3 are advantageously driven by a common control voltage $V_c$. In principle it would also be possible to provide an individual control voltage to drive one of the diodes.

The way in which the switching elements function has already been explained in association with FIG. 2, and also applies in a corresponding way to FIG. 3.

In principle it is possible to block just one of the receiving paths RX1, RX2 or RX3, as explained above. Alternatively it is possible for at least two of the receiving paths, RX1 and RX2, RX1 and RX3, or, as in FIG. 3, the paths RX2 and RX3, to be blocked.

In FIG. 3 output-side matching networks AN3, AN4, AN5 are incorporated in each of the receiving paths RX1, RX2, RX3 of the diversity front-end circuit. This kind of matching network can also be included in other embodiments.

Figure 4:
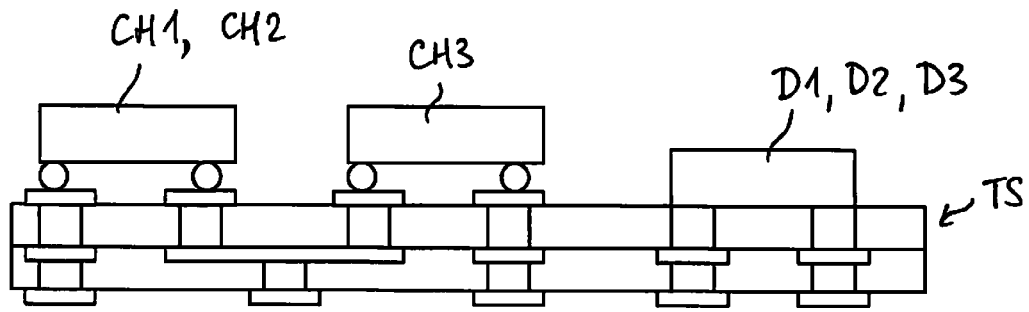
FIG. 4 shows a cross-section of a component with a carrier substrate and chips mounted on the substrate.
Figure 5:
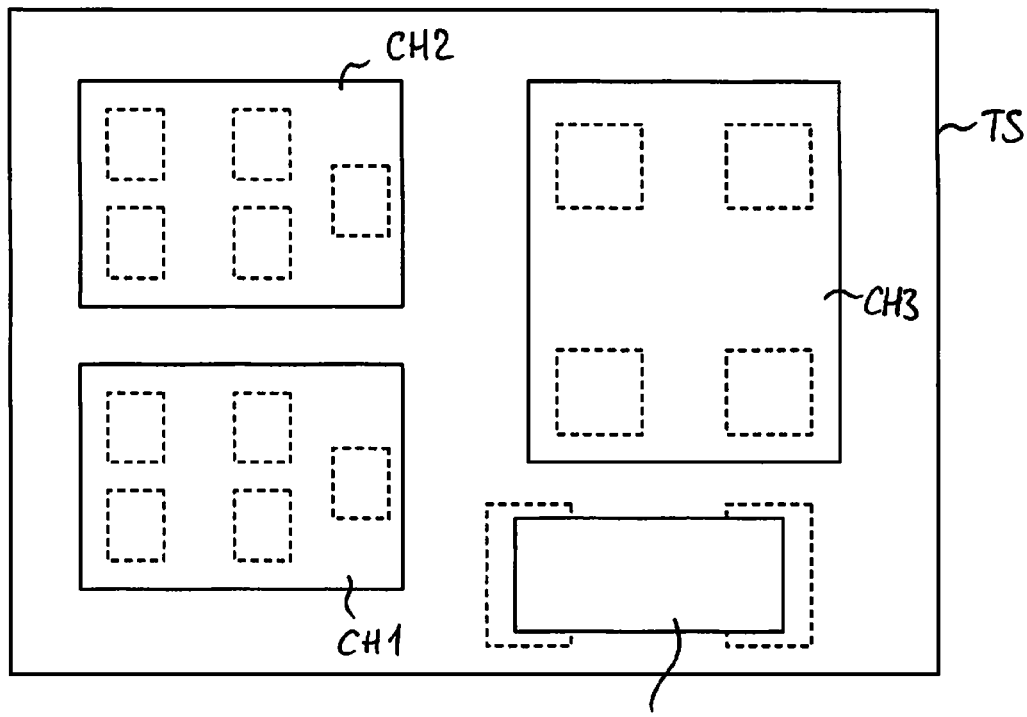
FIG. 5 shows a top view of the component illustrated in FIG. 4.

Different views of the diversity section of the component can be seen in FIGS. 4 and 5. The component comprises a carrier substrate TS with chips CH1, CH2, CH3 mounted on it. Filter F1 is implemented in chip CH1, filter F2 in chip CH2 and filter F3 in chip CH3. The diodes D1, D2, D3 are preferably also located on the carrier substrate TS. Filters F1 to F3 can also be located in a common chip. The diodes, too, can also be arranged in a common chip or in a common package.

The number of receiving paths that can be implemented in the component in the diversity front-end circuit is not limited to three. Four or more receiving paths may also be provided. The design of the matching networks AN, AN1, AN2 can, in principle, take any form as long as the phase rotation required for impedance matching in the passband, and the associated mismatch in the stop band, can be achieved at the input to each of the receiving paths.

What is claimed is:

1. An electrical component comprising: a diversity front-end circuit that is exclusively designed to transmit received signals, a carrier substrate, at least one chip arranged on the carrier substrate, wherein acoustic filters are implemented in the at least one chip, and a further front-end circuit that is not electrically connected to the diversity front-end circuit, wherein the diversity front-end circuit is capable of receiving signals in at least two frequency bands simultaneously, wherein the diversity front-end circuit comprises at least two receiving paths connected to a diversity antenna, wherein, in each receiving path, the received signals of a corresponding frequency band are forwarded, wherein at least one element of a matching network is arranged on or in the carrier substrate, wherein the carrier substrate comprises a plurality ceramic layers and a metallization layer between two ceramic layers, wherein at least one element of the matching network is implemented in the metallization layer, wherein separation of signals between different receiving paths of the diversity front-end circuit is achieved using entirely passive components and without any active semiconductor switching elements, wherein the further front-end circuit is designed to carry transmission and reception signals in at least those frequency bands for which the diversity front-end circuit is also designed, wherein the diversity front-end circuit includes a diode that is operated by a control voltage Vc, wherein the diode constitutes a DC path to ground when the diode is switched on, wherein the diode establishes a shunt branch connecting at least one of the receiving paths of the diversity front-end circuit to ground, wherein the diversity front-end circuit is capable of receiving incoming signals in at least three frequency bands simultaneously, wherein the diversity front-end circuit comprises an antenna path connected to the diversity antenna and a crossover network connected to the diversity antenna, wherein the antenna path is used to transmit the received signals in at least three different frequency bands, wherein the crossover network connects the antenna path to the at least three receiving paths designed for the at least three frequency bands, wherein each of the at least three receiving paths comprises an acoustic wave filter arranged within the receiving path, wherein each of the at least three receiving paths comprises, on an antenna side, a matching network arranged between the diversity antenna and the acoustic wave filter, and wherein the matching network provides impedance matching between the diversity antenna and the acoustic wave filter at a frequency in a passband of the acoustic wave filter.

2. The component according to claim 1,
wherein the diversity front-end circuit comprises at least three receiving paths connected to the diversity antenna, and
wherein each receiving path transmits a received signal in a corresponding frequency band.

3. The component according to claim 1, wherein no output signals are transmitted on the antenna path associated with the diversity antenna.

4. The component according to claim 1, wherein the matching network comprises at least a section of a high-frequency transmission line.

5. The component according to claim 1, wherein the matching network comprises at least one low-pass filter and at least one high-pass filter.

6. The component according to claim 5, wherein at least two receiving paths are connected to the low-pass filter or to the high-pass filter.

7. The component according to claim 1, further comprising, at least one switching element that is connected to at least one of the receiving paths or arranged in the receiving path.

8. The component according to claim 7, wherein a switching element that is connected to a particular receiving path is arranged between the matching network and an acoustic filter arranged within this particular receiving path.

9. The component according to claim 7, wherein the switching element is designed to block a receiving path that is assigned to a frequency band in which received and transmitted signals are transmitted at at least one common frequency, or wherein a receiving path operating at a frequency with a relative spacing of less than 5% from a transmission band is blocked by the switching element.

10. The component according to claim 1, wherein a capacitor is connected in series with the diode in the shunt branch.

11. The component according to claim 10, wherein the diode and the capacitor constitute a series resonant circuit, and wherein the series resonant circuit has a resonant frequency that is equal a transmission frequency that is to be suppressed in a signal path associated with the diode.

12. The component according to claim 1, wherein the diode is arranged on a carrier substrate or is implemented in the carrier substrate.

13. The component according to claim 1,
wherein at least one matching network is arranged within a corresponding receiving path of the diversity front-end circuit, and
wherein the acoustic wave filter in each receiving path is arranged between the matching networks at the antenna side and an output side.

14. The component according to claim 9, wherein the switching element is designed to block a receiving path that is assigned to a frequency band in which received and transmitted signals are transmitted at at least one common frequency.

15. The component according to claim 9, wherein a receiving path operating at a frequency with a relative spacing of less than 5% from a transmission band is blocked by the switching element.

* * * * *